United States Patent [19]

D'Iribarne et al.

[11] Patent Number: 5,183,491
[45] Date of Patent: Feb. 2, 1993

[54] MATERIAL FOR THE TEMPERING OF GLASS

[75] Inventors: Benoit D'Iribarne, Aachen, Fed. Rep. of Germany; Henri Mairlot, Acoz, Belgium; Paul Houang, Sao Paulo, Brazil

[73] Assignee: Saint-Gobain Recherche, Aubervilliers, France

[21] Appl. No.: 707,947

[22] Filed: May 28, 1991

Related U.S. Application Data

[63] Continuation of Ser. No. 477,126, Feb. 7, 1990, abandoned, which is a continuation of Ser. No. 257,684, Oct. 14, 1988, abandoned.

[30] Foreign Application Priority Data

Oct. 14, 1987 [FR] France .................. 87 14185

[51] Int. Cl.$^5$ .............................................. C03B 27/00
[52] U.S. Cl. ...................................... 65/351; 65/104; 65/114; 65/374.11; 65/374.13; 65/374.15
[58] Field of Search ............... 65/348, 374.11, 374.12, 65/374.13, 374.15, 24, 26, 169, 351, 114, 115

[56] References Cited

U.S. PATENT DOCUMENTS

| | | | |
|---|---|---|---|
| 1,955,163 | 4/1934 | Adams | 65/119 |
| 2,822,645 | 2/1958 | Weller et al. | 65/351 |
| 2,969,613 | 1/1961 | Lambert et al. | 65/273 |
| 3,265,488 | 8/1966 | Ross | 65/103 X |
| 3,311,463 | 3/1967 | Atkeson | 65/119 |
| 3,399,985 | 9/1968 | Greener et al. | 65/374.15 |
| 3,459,521 | 8/1969 | Nedelec | 65/356 X |
| 3,469,963 | 9/1969 | Beattie | 65/356 X |
| 3,586,492 | 6/1971 | McMaster | 65/273 X |
| 3,634,059 | 1/1972 | Miller | 65/374.11 X |
| 3,741,743 | 6/1973 | Seymour | 65/374.12 X |
| 3,778,244 | 12/1973 | Nedelec et al. | 65/106 |
| 3,840,360 | 10/1974 | Wright et al. | 65/119 |
| 4,043,786 | 8/1977 | Myers | 67/114 |
| 4,226,608 | 10/1980 | McKelvey | 65/106 |
| 4,526,605 | 7/1985 | Frank | 65/104 X |
| 4,661,141 | 4/1987 | Nitschke et al. | 65/273 |
| 4,678,495 | 7/1987 | Yoshizawa | 65/374.13 |
| 4,682,997 | 7/1987 | Halberschmidt et al. | 65/104 X |
| 4,764,196 | 8/1988 | Boutier et al. | 65/106 |
| 4,773,925 | 9/1988 | Schultz | 65/106 |
| 4,775,402 | 10/1988 | Letemps et al. | 65/107 |
| 4,802,903 | 2/1989 | Kuster et al. | 65/106 |
| 4,813,993 | 3/1989 | Letemps et al. | 65/273 |
| 4,820,327 | 4/1989 | Letemps et al. | 65/107 X |
| 4,865,638 | 9/1989 | Kudo | 65/273 |
| 4,906,271 | 3/1990 | D'Iribarne et al. | 65/104 |
| 4,992,088 | 2/1991 | Sassanelli et al. | 65/289 X |

FOREIGN PATENT DOCUMENTS

766145 10/1971 Belgium .................. 65/106
1083638 4/1986 Japan .................. 65/374.15

Primary Examiner—Robert L. Lindsay
Attorney, Agent, or Firm—Oblon, Spivak, McClelland, Maier & Neustadt

[57] ABSTRACT

Disclosed is a material for a tempering process of glass plates utilizing a so-called contact process. It proposes a material with a base of an arrangement of thin metallic threads exhibiting a heat resistance on the order of $0.25 \cdot 10^{-3}$ to $2.5 \cdot 10^{-3} m^2 \cdot K \cdot W^{-1}$ intended to be inserted between the cooling plates and the glass of a contact-tempering installation. The process makes it possible to temper glazings sufficiently so that they are used as automobile glazings and the durability of this thread-based material is compatible with an industrial usage.

15 Claims, 1 Drawing Sheet

MATERIAL FOR THE TEMPERING OF GLASS

This application is a continuation of application Ser. No. 07/477,126, filed on Feb. 7, 1990, now abandoned, which is a continuation of application Ser. No. 07/257,684, filed on Oct. 14, 1988, now abandoned.

BACKGROUND OF THE INVENTION

1. Field of the Invention

This invention relates to a material for the tempering of glass plates, optionally accompanied by their bending, and applies more particularly to the so-called contact-tempering process.

2. Discussion of the Background

It is known from Japanese Patent No. 39-1029 to insert, between the glass and the cooling plates of a contact-tempering device, a material having a mechanical and heat buffering role. The materials proposed include fabric impregnated with silicone oil or grease, i.e. glass cloth which, however, are not satisfactory because they react chemically with the glass (silicone) or are too fragile and are thereby incompatible with an industrial use. A fine and flexible metal sheet, for example, of lead, has been proposed also as another buffering material. In addition to the unsuitability of the heat characteristics of such a metal sheet for the tempering of glass, there is a possible difficulty in precisely applying this metal sheet to cooling plates having complex, nondevelopable shapes.

The inconclusive test of using rovings of metallic threads to contact-temper glass is further mentioned in this prior patent JP 39-1029, since these metallic threads are, on the one hand, difficult to use and, on the other hand, are damaging to the surface of the glass.

SUMMARY OF THE INVENTION

This invention aims at solving this problem of tempering glass, by the so-called contact process, by proposing materials intended to be inserted between the cooling plates of the contact-tempering installation and the glass.

It is important that these proposed materials not have the drawbacks of the materials previously tested. Thus, they must exhibit a chemical inertness with respect to the glass and its possible coatings (enamel, particularly); they must not harm the glass and/or its coatings and must have a surface evenness which preserves the optical quality of the glass. They must also be capable of a good deformability to adapt to complex shapes, in particular nondevelopable shapes, able to be given to the glass or that the glass can already possess. Further, to make possible a tempering that allows the use of glazings thus produced such as automobile glazings (complying with Rule No. 43 of the United Nations Agreement relating to the adoption of uniform conditions of certification and the reciprocal recognition of the certification of the equipment and parts of motor vehicles), they must possess a suitable heat resistance, and to be used industrially they must possess a good mechanical strength and a durability that allows for a large number of heat cycles from about 150° C. to 650° C. in a short time (i.e. several hundred cycles of about 10 seconds).

To do this, this invention proposes a porous material intended to be inserted between cooling plates of a contact-tempering, and optionally bending, installation and the glass, this material exhibiting a heat resistance which, for glass with a thickness varying between 1 and 10 mm, is between about $0.25 \cdot 10^{-3}$ to $10 \cdot 10^{-3}$ $m^2 \cdot K \cdot W^{-1}$, the heat resistance being the ratio of the thickness of the material to its heat conductivity. Preferably, this heat resistance is between $0.25 \cdot 10^{-3}$ and $2.5 \cdot 10^{-3}$ $m^2 \cdot K \cdot W^{-1}$. More specifically, for glass on the order of 3 to 4 mm thick to be contact-tempered, the heat resistance of the recommended material is on the order of $10^{-3}$ to $1.5 \cdot 10^{-3}$ $m^2 \cdot K \cdot W^{-1}$.

This material, directly in contact with the glass, consists of thin threads at least some of which are metallic. These thin threads are arranged in rovings which are woven, knitted, interlaced or fritted. Advantageously, for contact-tempering, this thickness of threads is placed next to a thickness of a mechanical buffering material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
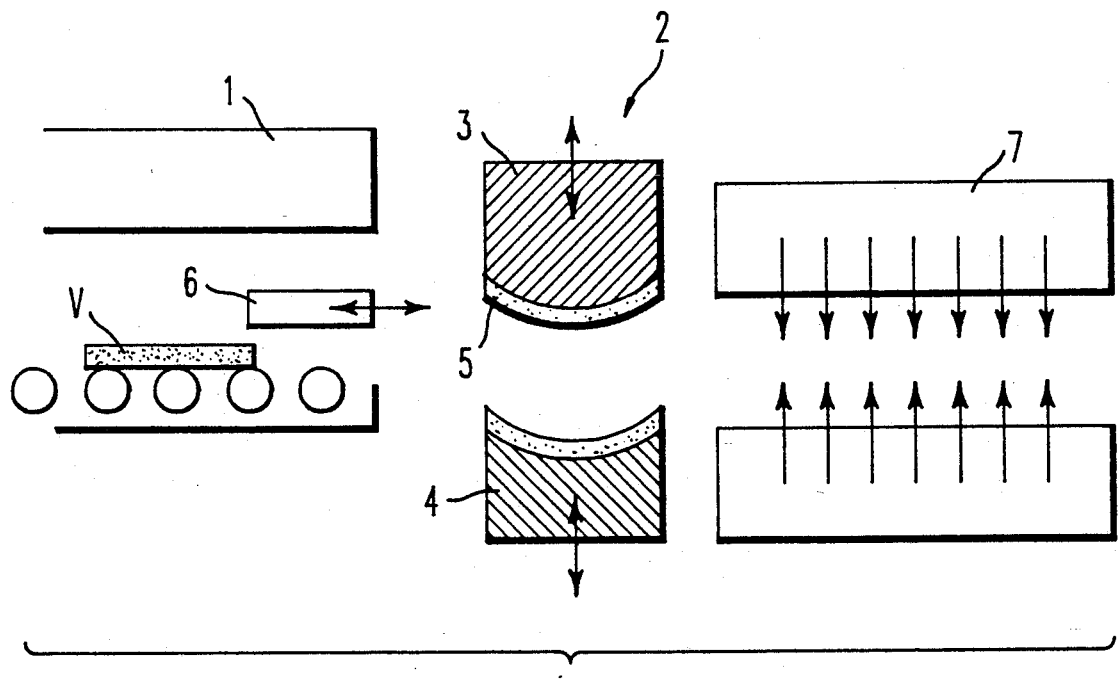
FIG. 1 is a diagram of an installation for tempering and optionally bending of glass sheets by the so-called contact process.

FIG. 1 gives the general diagram of an installation for tempering and optionally bending of glass sheets by the so-called contact process. Such installation comprises essentially a furnace 1 for heating the glass sheets V to be treated at a temperature higher than the transformation temperature of the glass, i.e., a temperature on the order of 600° to 650° C., a tempering and optionally bending station 2 having essentially two cooling plates 3 and 4 positioned opposite one another, mobile in relation to one another to be able to be applied against glass sheets V in a stage to temper them and optionally bend them, to be able to separate one from the other in another stage to allow for the removal of the treated glass sheet and the introduction of the next glass sheet to be treated, and also means 6 to support and convey the glass sheets from furnace 1 to tempering and optionally simultaneous bending station 2. Advantageously, tempering and optionally simultaneous bending station 2 is followed by a secondary cooling station 7 in which the glass sheets whose stresses have been set by contact with cooling plates 3 and 4, will complete their cooling, thus quickly freeing plates 3 and 4 for the tempering and optionally the bending of other glass sheets.

Means 6 for supporting and conveying the glass sheets includes a roller and/or gas cushion conveyor, or an upper, partial vacuum transfer element that can move on rails (not shown), or else another equivalent system.

Cooling plates 3 and 4 have faces intended to be applied to the glass sheets covered with materials 5 that are both a heat and mechanical buffer. Advantageously, they are cooled, for example by circulation of water or the like in them, to prevent them from becoming too heated and deforming in case of use at high speed.

Advantageously, also to avoid deformations under the effect of heat and in particular under the effect of the large thermal gradient existing between the surface of cooling plates 3 and 4 and their cooled core, said cooling plates are of a material which deforms very little when heated. Thus, materials are more especially suited for which the ratio of the coefficient of linear expansion to heat conductivity is slight, such as for example graphite.

This buffer 5 covering cooling plates 3 and 4 is made of at least one layer 8 (see FIG. 2), directly in contact with the glass, which is of a porous material exhibiting heat resistance, i.e., a ratio between the thickness of said material and its heat conductivity, between about $0.25 \cdot 10^{-3}$ and $2.5 \cdot 10^{-3}$ $m^2 \cdot K \cdot W^{-1}$ when tempering glass sheets with a thickness varying between 1 and 10 mm are involved.

Such a material makes it possible to reduce the flow of heat between the glass and cooling plates 3 and 4, and it allows temperings that satisfy Rule No. 43 of the United Nations Agreement relating to the adoption of uniform conditions of certification and the reciprocal recognition of the certification of the equipment and parts of motor vehicles. According to this rule, an automobile glazing must have tempering stresses such that when it breaks following an impact in one of the places prescribed in this Rule, the number of fragments in any 5 cm × 5 cm square is not less than 40 nor greater than 350 (a number carried to 400 for glazings 3.5 mm thick and below), no fragment has more than 3 $cm^2$ of surface except possibly in a 2 cm-wide strip on the periphery of the glazing and in a radius of 7.5 cm around the point of impact and no elongated fragment more than 7.5 cm long should exist.

Within the proposed range of heat resistances, the desired heat resistance can be adjusted as a function of the tempering degree sought, the resistance having to be lower the finer the fragmentation desired; it can be adjusted also as a function of the thickness of the glass to be tempered, said heat resistance having to decrease when the thickness of the glass decreases to keep the same fragmentation.

By adopting, for contact-tempering, materials whose resistance is, considering the thickness of the glass to be treated, relatively low or, on the other hand, relatively high, although within the range of the proposed resistances, there can also be obtained, if need be, glass sheets not satisfying Rule 43 of the United Nations, and having high tempering levels (finer fragmentation than that required by Rule 43) or on the other hand, low tempering levels (greater fragmentation than that required by Rule 43). These glass sheets cannot be used as simple, tempered glazings for the automobile, but they can be used, for example, in building or as one of the constituents of a laminated glazing intended for the automobile, for aircraft or the like.

Appropriate heat resistance can be obtained from a porous material, for example consisting of an assembly of threads, ordered or not. The threads can be of different natures (carbon, metallic, . . . ), however, to assure a long service life for this buffer inserted between the glass and cooling plates 3 and 4, at least some of the threads are metallic.

Both to give the buffering material a capacity to store in itself an amount of air able to impart to it the desired heat resistance, and a surface evenness which does not run the risk of causing damage to the glass, the threads used and in particular the metallic threads, are of slight diameter, as slight a diameter as possible, in any case less than 50 microns and preferably less than 15 microns.

The fineness of the threads and the porosity of the material, make it possible for said material to avoid storing heat and to be overall insulating despite the intrinsic heat conductivity of the metallic threads.

The metallic composition of all or part of the threads obtains for these materials the durability and the mechanical strength required by the planned application. These threads are assembled in rovings, which—or some of which, at least—are then braided, knitted, interlaced or fritted to constitute the desired material. Depending on the variants, the threads are directly fritted, woven, knitted, interlaced, without having been previously assembled in rovings. The above-described assembly further increases the porosity of the material and, furthermore, improves the capacities of the material to be deformed and to be adapted to cooling plates in varied shapes.

Various examples of materials having the previously defined heat resistance have been tested successfully to temper glass sheets and optionally simultaneously bend them, the cooling plates exhibiting in the case of a simultaneous bending, the desired shape for the glass sheets.

EXAMPLE 1

Fabric of rovings of woven carbon threads, obtained from threads 12 to 14 microns in diameter. Thickness of the fabric: 0.1 mm. Heat resistance: $10^{-3}$ $m^2 \cdot K \cdot W^{-1}$.

Used for tempering and simultaneous bending of glass sheets 3 or 4 mm thick satisfying Rule 43 of the United Nations.

The heat qualities of the fabric are satisfactory; however, its mechanical strength does not permit an industrial use.

EXAMPLE 2

Fabric 0.14 mm thick consisting of fritted, stainless steel fibers 12 to 14 microns in diameter. Heat resistance: $10^{-3}$ $m^2 \cdot K \cdot W^{-1}$.

Tested successfully for the tempering and simultaneous bending of glass sheets 3 mm thick satisfying Rule 43 of the United Nations.

EXAMPLE 3

Fabric 0.14 mm thick obtained from the same weavings of stainless steel threads 12 to 14 mm in diameter. Heat resistance: $10^{-3}$ $m^2 \cdot K \cdot W^{-1}$.

Tested successfully for the tempering and simultaneous bending of glass sheets 3 mm thick satisfying Rule 43 of the United Nations.

EXAMPLE 4

Fabric obtained from rovings comprising two types of stainless steel threads. Heat resistance: $1.5 \times 10^{-3}$ $m^2 \cdot K \cdot W^{-1}$.

Tested successfully for the tempering and simultaneous bending of glass sheets 3 mm thick satisfying Rule 43 of the United Nations.

EXAMPLE 5

Fabric 0.42 mm thick obtained from Inconel threads. Heat resistance: $2.1 \times 10^{-3}$ $m^2 \cdot K \cdot W^{-1}$.

Tested for the tempering and simultaneous bending of glass sheets 3 or 4 mm thick. The degree of tempering obtained did not satisfy rule 43, the fragmentation being too low. These glasses 3 or 4 mm thick that have too low a tempering level cannot be used as simple glass in the automobile. To be used in the automobile, they must be incorporated into a laminated glazing.

This same fabric makes it possible to temper, under the conditions of Rule 43, glass sheets 6 or 8 mm thick. The same fragmentation can be obtained on glasses 6 mm thick or glasses 8 mm thick by modifying the pressure of the cooling plates on the glass during tempering, therefore by more or less crushing the fabric, the crushing of the fabric having to be slighter to temper thinner glass to the same degree.

EXAMPLE 6

Fabric 0.08 mm thick woven from a single thread of bronze 0.04 mm in diameter. Heat resistance: $0.25 \times 10^{-3}$ m$^2 \cdot$K$\cdot$W$^{-1}$.

Tested successfully for the tempering and simultaneous bending of glass sheets 1.6 mm thick satisfying Rule 43. Also allowed "hypertempering," i.e., with a fragmentation higher than that defined in Rule 43, of glass sheets 3 or 4 mm thick.

EXAMPLE 7

Fabric of 0.08 mm thick woven from a single thread of stainless steel 0.04 mm in diameter. Heat resistance: $0.25 \times 10^{-3}$ m$^2 \cdot$K$\cdot$W$^{-1}$.

Tested successfully for the tempering of glass 1.6 mm thick satisfying Rule 43.

"Hypertempering" of glass sheets 3 and 4 mm thick.

EXAMPLE 8

Fabric 0.45 mm thick obtained by weaving rovings of stainless steel threads. Heat resistance: 2.1 $10^{-3}$ m$^2 \cdot$K$\cdot$W$^{-1}$.

Tempering according to Rule 43 of glasses 6, 8, and 10 mm thick. Strengthening (tempering with fragmentation less than that defined by Rule 43) of glass sheets 3 and 4 mm thick.

As already mentioned in the examples, various heat resistances can be obtained from the same fabric by varying the crushing of said fabric during the tempering, which makes it possible to modify the tempering without modifying the material.

Local modifications of the overall tempering level of glass sheets can also be obtained by placing at the desired place a portion of fabric having heat characteristics different from the fabric placed everywhere else on the cooling plates.

In all the above examples except Example 1, the life of the fabric is such that industrial use does not pose any problem. A fabric made from two types of rovings or threads, some metallic, others of carbon, is, however, also satisfactory.

Advantageously, for the contact-tempering and bending application, the layer of material having a heat resistance between 0.25 and $2.5 \times$ m$^2 \cdot$K$\cdot$W$^{-1}$ is associated with a sublayer 9 (see FIG. 2) of another material acting essentially as a mechanical buffer.

Actually, the heat resistance stresses and the stresses of surface evenness, and the fineness of the threads imposed on the material of layer 8 cause the role of mechanical buffer most often not to be able to be filled integrally and optimally by said layer 8.

For this reason it is desirable to have an additional sublayer 9.

Figure 2:
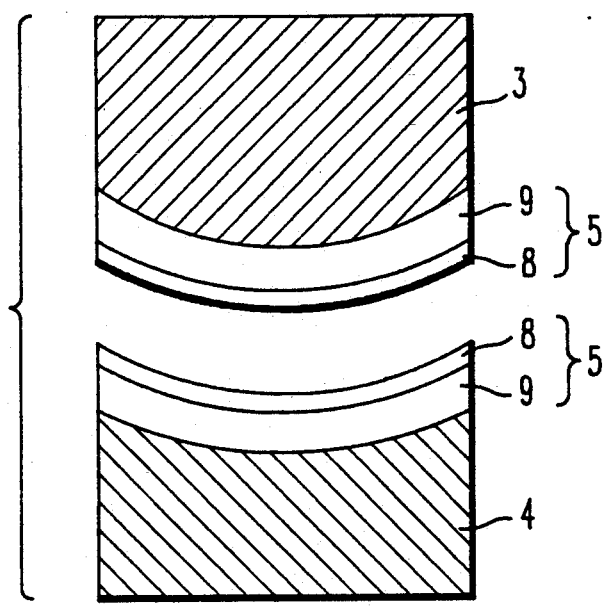
FIG. 2 is a diagram of the structure of a buffer inserted between the cooling plates of a contact-tempering installation and the glass.

As can be seen in FIG. 2, cooling plates 3 and 4 therefore receive a covering 5 on their faces intended to come in contact with the glass sheets to be tempered and optionally bent, this covering 5 advantageously consisting of a layer 8 essentially acting as a heat buffer, the one described previously, and of a sublayer essentially acting as a mechanical buffer, described below.

Thus, in general, having two layers superposed to form buffer 5, it is easier to select, for each one of these layers, the materials able to fill optimally the roles of a mechanical buffer, on the one hand, and of a heat buffer, on the other hand.

Since the material of sublayer 9 acts essentially as a mechanical buffer, it must possess an elasticity and an compressibility sufficient to compensate for the imperfections of the machining and adjusting of cooling plates 3 and 4. This elasticity, however, must not be accompanied by too much softness, because in case of untimely breaking of the glass, the material would be marked and would have a harmful influence on the optical quality of the subsequently tempered glass sheets. Of course, it also possesses capacities of heat strength, chemical inertness with respect to the glass and deformability.

Thus, the materials will be suitable for which the variation of thickness is between 0.01 and 0.5 mm for pressures undergone that are spread from 0.1 to 10 bars. In the current cases where the machining tolerances of the cooling plates are on the order of 0.05 to 0.1 mm and where the uncertainties of adjustment are from 0.05 to 0.10 mm, preferably as materials those will be suitable whose thickness variation is spread between 0.05 mm and 0.2 mm for pressures varying from 0.1 to 10 bars. In other words, the materials will be suitable that have a Young's modulus between 0.1 MPa and 100 MPa and more frequently to respond to the current cases, the materials will be suitable whose Young's modulus is between 0.5 MPa and 20 MPa.

Furthermore, this sublayer must not hide the heat characteristics of the material acting essentially as a heat buffer, i.e., the material of layer 8. In particular, this sublayer must not constitute an additional, substantial heat resistance opposed to the heat flow coming from the cooling plates.

Thus, sublayer 9 must possess a considerable heat conductivity in the direction perpendicular to that of the glass sheets to be tempered and to that of cooling plates 3 and 4. This heat conductivity must be at least on the order of 2 W$\cdot$m$^{-1} \cdot$°C.$^{-1}$ and preferably at least 4, which leads to a heat resistance substantially lower than that of material 8 that acts as a heat buffer (at least 2 times lower and preferably at least ten times lower).

Advantageously, the heat conductivity in the longitudinal direction, i.e., in the direction tangent to the cooling plates, is considerable to make possible the removal of calories extracted from the glass. Thus, a material sold under the name "PAPYEX" by the "Carbone Lorraine" Company is suitable. This material is made of expanded graphite, is sold in sheets, and has an anisotropic structure such that the conductivity in the plane of the sheet, i.e., in the direction tangent to that of the cooling plates is considerable, is more considerable than that in the perpendicular direction, at least 10 times more considerable. Thus, these conductivities are respectively 4 and 160 W$\cdot$m$^{-1} \cdot$°C.$^{-1}$ for the tested sample. This material is used in thickness from 0.2 mm to 4 mm and, preferably, from 0.5 to 2.5 mm.

Layer 8 and sublayer 9 can be only placed next to and fastened to plates 3 and 4, or advantageously glued to avoid any air pocket.

Obtaining of tempered glazings having locally at least one zone having a different tempering level can also be obtained by providing a sublayer having, locally in at least one zone, properties different from those of the rest of the surface.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an installation for contact-tempering glass plates, said glass plates having a thickness of 1 to 10 mm, said installation including cooling plates mounted so as to be movable toward one another for holding the glass plates positioned therebetween, a layer of material supported by each of the cooling plates for direct contact with the glass plates such that the glass plates are contacted only by the material when the glass plates are held by the cooling plates, each said material comprising a heat resistant material having a heat resistance of between about $0.25 \cdot 10^{-3}$ and $1 \cdot 10^{-2}$ m$^2 \cdot$K$\cdot$W$^{-1}$, wherein said material comprises threads having a diameter of less than 50 microns, at least some of said threads being metallic.

2. The installation of claim 1 wherein said cooling plates are curved so as to bend the glass sheets simultaneously with the contact-tempering thereof.

3. The installation of claim 1, wherein said threads have a diameter of less than 15 microns.

4. The installation of claim 3, wherein at least some of said threads comprise carbon threads.

5. The installation of claim 1, wherein said heat resistance is between $0.25 \times 10^{-3}$ and $2.5 \cdot 10^{-3}$ m$^2 \cdot$K$\cdot$W$^{-1}$.

6. The installation according to claim 1, wherein said threads are braided, woven, knitted, fritted, interwoven or arranged in rovings, themselves braided, woven, knitted, interwoven or fritted.

7. The installation according to claim 1, including a sublayer between said material and a respective one of said cooling plates, said sublayer having a Young's modulus of between 0.1 MPa and 100 MPa.

8. The installation according to claim 7, wherein said Young's modulus is between 0.5 and 20 MPa.

9. The installation according to claim 8, wherein said sublayer possesses, in a direction perpendicular to that of the cooling plates, a heat conductivity of at least 2 W$\cdot$m$^{-1} \cdot$°C$^{-1}$.

10. The installation according to claim 9, wherein said heat conductivity is at least 4 W$\cdot$m$^{-1} \cdot$°C$^{-1}$.

11. The installation according to claim 9, wherein said layer has an anisotropic structure with properties of high heat conductivity in a direction tangent tot he cooling plates, said high heat conductivity being at least ten times higher than heat conductivity in another direction.

12. The installation according to claim 11, wherein said sublayer comprises expanded graphite having a thickness form 0.2 to 4 mm.

13. The installation according to claim 12, wherein the thickness of said sublayer is from 0.5 to 2.5 mm.

14. The installation according to claim 1, wherein said cooling plates are formed of a material having a low value of the linear expansion coefficient ratio to heat conductivity.

15. The installation according to claim 1, wherein said cooling plates are formed of graphite.

* * * * *